United States Patent [19]
Francis

[11] 3,817,572
[45] June 18, 1974

[54] AIR-BORNE PARTICLE DEFLECTOR FOR VEHICLE WINDSHIELDS

[76] Inventor: George E. Francis, 115 S. Gore, Webster Groves, Mo. 63119

[22] Filed: Mar. 12, 1973

[21] Appl. No.: 340,060

Related U.S. Application Data

[63] Continuation-in-part of Ser. No. 227,030, Feb. 17, 1972, abandoned.

[52] U.S. Cl.................................. 296/91, 296/1 S
[51] Int. Cl............................................. B60j 1/20
[58] Field of Search............................. 296/1 S, 91

[56] References Cited
UNITED STATES PATENTS

| | | | |
|---|---|---|---|
| 2,223,378 | 12/1940 | Martin | 296/91 |
| 2,963,315 | 12/1960 | Wilsdorf | 296/91 |
| 3,214,215 | 10/1965 | Hansen | 296/91 |
| 3,647,256 | 3/1972 | Cox | 296/91 |

FOREIGN PATENTS OR APPLICATIONS

| | | | |
|---|---|---|---|
| 577,195 | 5/1958 | Italy | 296/91 |

*Primary Examiner*—Albert J. Makay
*Assistant Examiner*—Leslie J. Paperner
*Attorney, Agent, or Firm*—Koenig, Senniger, Powers and Leavitt

[57] ABSTRACT

A deflector for deflecting air-borne particles, such as insects, rain, roadspray and the like clear of the windshield of an automobile. The deflector includes a channel-shaped member with web and side flanges. One end of the channel is closed. The member is mounted inverted on an automobile hood, the side flanges extending longitudinally of the hood and the closed end of the member being at the rear of the hood so as to form in conjunction with the hood an air scoop. The front end of the member is spaced above the hood to form a forward facing inlet opening into which air is rammed as the automobile is driven at highway speeds. A plurality of air outlets are provided in the rear margin of the member extending transversely of the hood for directing air rammed into the scoop in a generally vertical direction, and outlet openings may also be provided in the side flanges for directing air sidewise from the scoop. The air exhausted from the outlets in the back and sides of the scoop forms an air cushion extending transversely of the hood for deflecting air-borne particles clear of the windshield.

13 Claims, 7 Drawing Figures

PATENTED JUN 18 1974　3,817,572

AIR-BORNE PARTICLE DEFLECTOR FOR VEHICLE WINDSHIELDS

CROSS-REFERENCE TO RELATED APPLICATION

This application is a continuation-in-part of my copending application Ser. No. 227,030, filed Feb. 17, 1972 now abandoned.

BACKGROUND OF THE INVENTION

This invention relates to air deflectors for automobiles, trucks, busses and other vehicles for deflecting air-borne particles (e.g., insects, rain, roadspray and the like) clear of the windshield of the vehicle, and is particularly concerned with an air deflector which generates a vertically directed air curtain forward of the windshield of the vehicle for directing these air-borne particles up and over the windshield.

More particularly, this invention is concerned with a deflector which directs a plurality of streams of air in a generally vertical direction at the front of the hood of the vehicle to strike airborne particles and lift them clear of the windshield before they can impact thereon. An air deflector utilizing an air curtain is shown in U.S. Pat. No. 3,214,215 in which a flat funnel is secured to the hood of an automobile immediately forward of the windshield. Air is rammed into the funnel and vertically exhausted therefrom to form an air curtain immediately forward of the windshield. However, because the curtain is adjacent the windshield, many particles strike the windshield before they can be vertically deflected over it. Additionally, the funnel projects above the hood a substantial distance and thus may partially block the forward vision of the driver. Other examples of typical prior art deflectors are shown in such U.S. Pat. Nos. as 2,223,378 and 2,697,490. Generally, these other prior art deflectors require substantial modifications to the automobile on which they are installed.

SUMMARY OF THE INVENTION

Among the several objects of this invention may be noted the provision of an air deflector which is readily secureable to the forward portion of an automobile hood without substantial modification thereto; the provision of such a deflector which forms a generally vertical air curtain transversely of the hood of the automobile at the forward end thereof for effectively deflecting air-borne particles up and over the windshield; the provision of such a deflector which generally does not block the driver's view of the road; the provision of such a deflector which may be installed on and removed from a vehicle without substantial damage thereto; and the provision of such a deflector which, in one form, extends across only a portion of the hood and yet effectively deflects air-borne particles clear of the windshield over its entire width. Other objects and features of this invention will be in part apparent and in part pointed out hereinafter.

In general, a deflector of this invention for deflecting air-borne particles such as insects, rain, roadspray and the like, clear of the windshield of an automobile comprises a member of channel shape in section having a web, side flanges and means at one end thereof closing the channel. This member is adapted to be mounted in inverted position on the hood of an automobile with the flanges extending longitudinally of the hood and with the closed end of the member at its rear to form in conjunction with the hood an air scoop. The other end of the member constituting its front end is spaced above the hood to form a forward facing inlet opening into which air is rammed as the automobile is driven at highway speeds. The height of the scoop decreases from front to rear and the member has a plurality of outlet openings formed in the margin of the web extending transversely of the hood at the rear thereof. These openings constitute outlets for directing air rammed into the scoop in a generally vertical direction to thereby form an air curtain extending transversely of the hood of the automobile for deflecting the air-borne particles clear of the windshield.

BRIEF DESCRIPTION OF THE DRAWINGS

Corresponding reference characters indicate corresponding parts throughout the several views of the drawings.

DESCRIPTION OF THE PREFERRED EMBODIMENT

Figure 2:
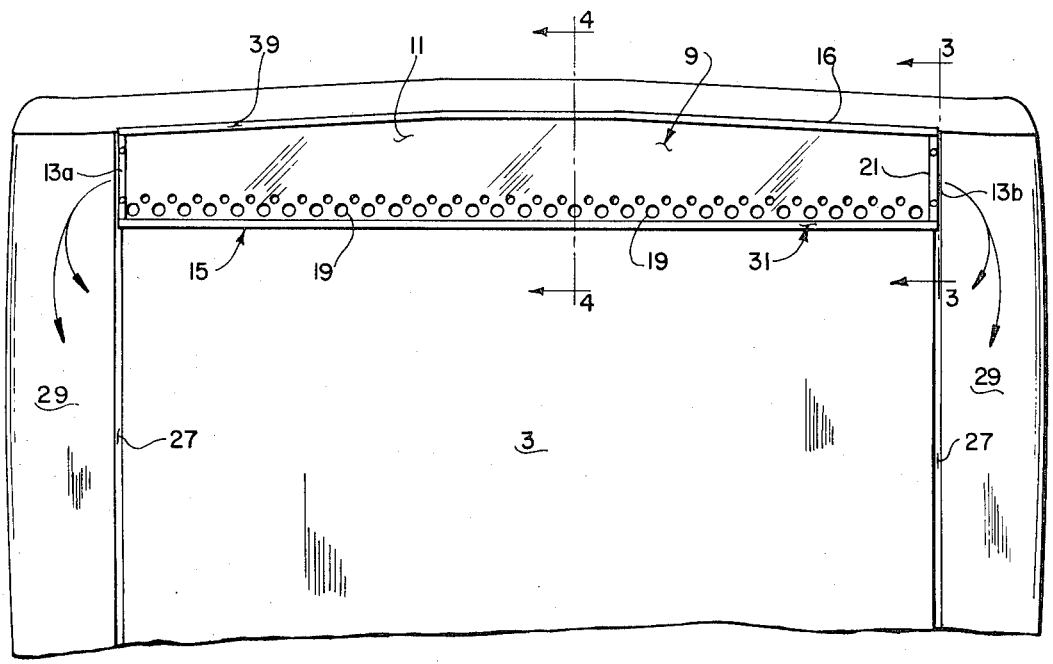
FIG. 2 is a plan view of the deflector as it is mounted on the hood of the automobile.
Figure 3:
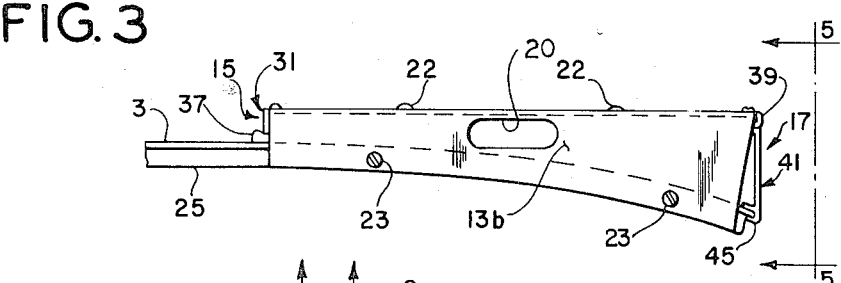
FIG. 3 is an enlarged elevation taken along line 3—3 of FIG. 2 showing the deflector secured to the hood.

Referring to the drawings, a deflector of this invention, indicated in its entirety at 1, is shown mounted on the forward portion of a hood 3 of an automobile generally indicated at 5 for deflecting air-borne particles (e.g., insects, rain, roadspray and the like) clear of the windshield 7 of the automobile. The deflector includes a member 9 of channel-shaped cross-section which, as shown in FIG. 2, extends transversely of the hood from one side thereof to the other. Member 9 has a top web 11 preferably of transparent synthetic resin material extending transversely of the hood, and left and right side flanges 13a and 13b, respectively, extending longitudinally of the hood. The rear end 15 of the channel closes the deflector.

Figure 1:
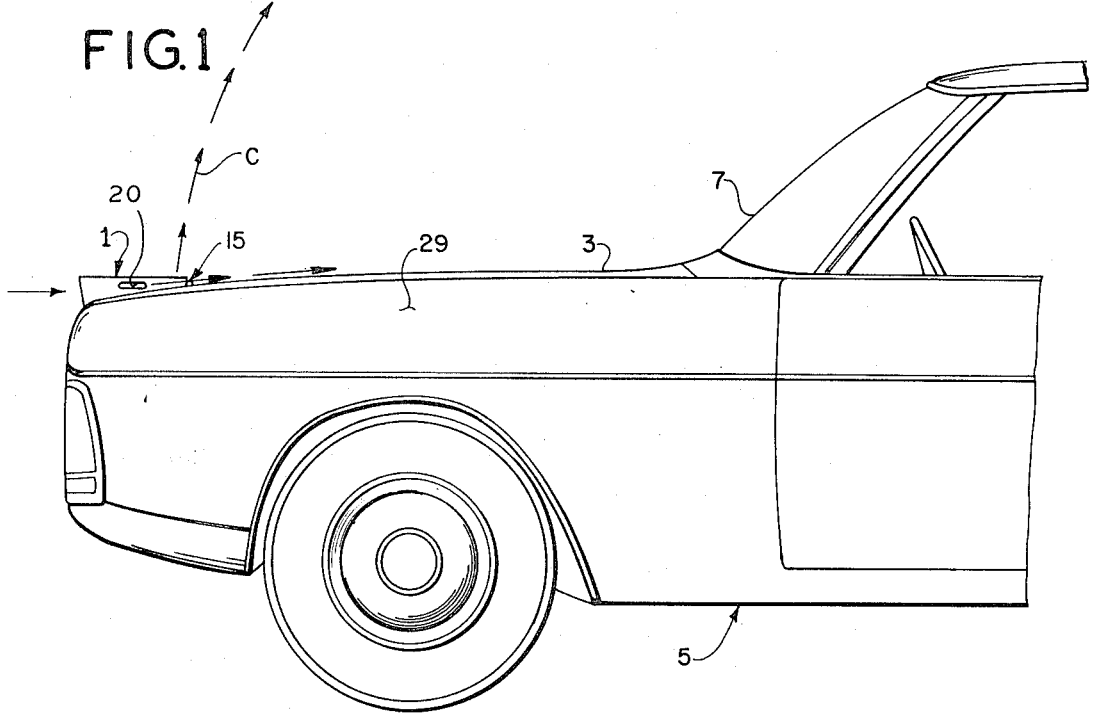
FIG. 1 is a fragmentary side elevation of an automobile having a deflector of this invention mounted on the forward portion of its hood and illustrating an air curtain (as depicted by the arrows) formed by the deflector for deflecting air-borne particles clear of the windshield.
Figure 4:
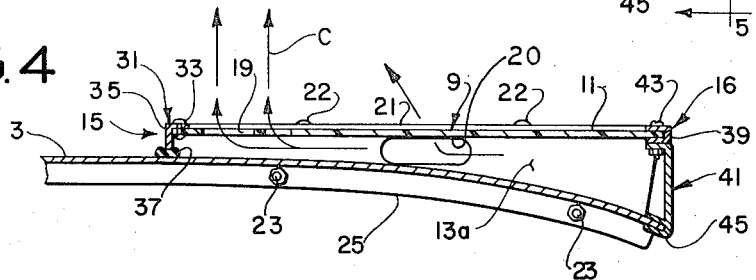
FIG. 4 is an enlarged vertical section taken along line 4—4 of FIG. 2 showing air being directed from outlets in the rear and the sides of the deflector to form the air curtain.

As shown in FIG. 4, channel member 9 is secured to the forward portion of hood 3 in inverted position to form in conjunction with the hood an air scoop whose sides are supported by flanges 13a and 13b. Web 11 is spaced above the top surface of the hood and the height and cross-sectional area of the air scoop decreases from front to rear. On many present-day automobiles, the forward portion of the hood slopes downwardly. With deflector 1 mounted generally horizontally above the forward portion of the hood, the hood slopes downwardly away from web 11 permitting the deflector to have a relatively low profile as viewed from the side (i.e., its elevation is not substantially above the elevation of the hood adjacent the rear margin of the web). Thus, the driver's view of the road is not substantially blocked by a deflector of this invention. The forward edge 16 of the web is spaced above the forward edge of the hood to form a forward facing inlet 17 into which air is rammed as automobile 5 is driven at highway speeds. Web 11 has a plurality of holes or openings 19 (FIG. 2) in its rear margin extending the length of the web, i.e., extending tranversely of the hood. These openings constitute air outlets. The total area of the openings 19 is less than the cross-sectional area of inlet opening 17 so that the pressure of the air rammed into the scoop increases from front to rear with the result that air is directed from outlets 19 at high speed in a generally vertical direction (as indicated by the arrows in FIGS. 1 and 4) to form an air curtain C which extends along the length of the scoop transversely of the hood. The individual air streams from each of the outlet openings diffuse and overlap to form a continuous curtain. As an air-borne particle encounters the air curtain, the particle is forced clear of (above) windshield 7 before it strikes the windshield.

Slots 20 may optionally be provided in side flanges 13a and 13b. These slots constitute outlet openings for the discharge of air from the sides of the scoop. This sidewise discharge of air flows back along the fenders of the car and around the sides of the windshield 7, thereby substantially to prevent air-borne particles from striking the sides of the windshield. Furthermore, the air discharged from slots 20 is thought to be relatively free of air-borne particles due to its being rammed through the air scoop and exhausted sidewise from the slots (the heavier air-borne particles being forced to the rear of the scoop and discharged through outlets 19, thereby to be blown up and over the windshield by the air curtain). This cleaner air discharged from slots 20 strikes the sides of the windshield thereby preventing uncleaned air from doing so (thus keeping the sides of the windshield clean). Some of the "clean" air discharged from slots 20 curls behind the deflector into a low-pressure area formed adjacent its rear edge 15. Thus cleaner air flows into this low-pressure area further aiding in keeping windshield 7 free of air-borne particles.

Figure 5:
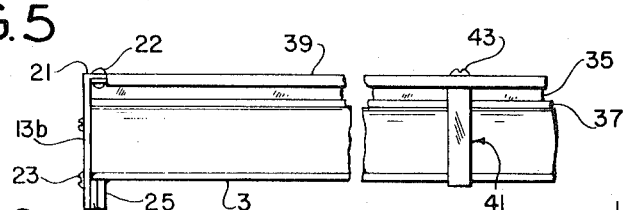
FIG. 5 is a front elevation of the deflector along line 5—5 of FIG. 3.

Member 9 is preferably secured to hood 3 in a manner permitting deflector 1 to be readily removed from the hood without damage to the hood. More particularly, side flanges 13a and 13b are of relatively thin sheet metal. These flanges each have a horizontal leg 21 at their upper end which extends inwardly toward the center of the deflector above web 11. The web is secured to these horizontal legs in any suitable manner such as by riveting as indicated at 22. The side flanges 13a, 13b each extend below the upper surface of the hood and is secured by bolts 23 to respective hood flanges 25 at each side of the hood. As shown in FIG. 5, a spacer 26 is provided between each hood flange 25 and the respective side flanges 13a, 13b. The side flanges 13a, 13b are adapted to extend into the gap 27 between each side of the hood and the inner edge of the adjacent fenders 29. Thus the hood may be raised and lowered without interference of side flanges 13a, 13b with the fenders.

An angle member 31 having a forwardly extending horizontal portion 33 and a downwardly extending vertical portion 35 is secured along the rear margin of web 11 aft of outlet openings 19 to close off the rear of the scoop and to strengthen the rear portion of the web. A length of resilient seal material (e.g., rubber weatherstripping) 37 placed between the bottom edge of vertical portion 35 and the upper surface of hood 3 protects the hood and seals the rear end of the scoop. It will be understood that vertical portion 35 of angle 31 may be contoured along its length to follow various contours of the automobile hood and thus insure that the rear portions of the scoop are sealed with respect to the hood.

A U-shaped reinforcing channel 39 is secured as by riveting to the front margin of web 11 to stiffen and strengthen the web. The front margin of the web is supported intermediate its ends by a brace 41 which maintains the web in desired spaced relation relative to the hood. The upper end of brace 41 is secured to the bottom of channel 39 by a bolt 43. A friction clip 45 at the bottom end of brace 41 frictionally engages the front edge of hood 3 to secure the brace thereto. Clip 45 permits brace 41 to be readily installed on and removed from the hood without damage.

Figure 6:
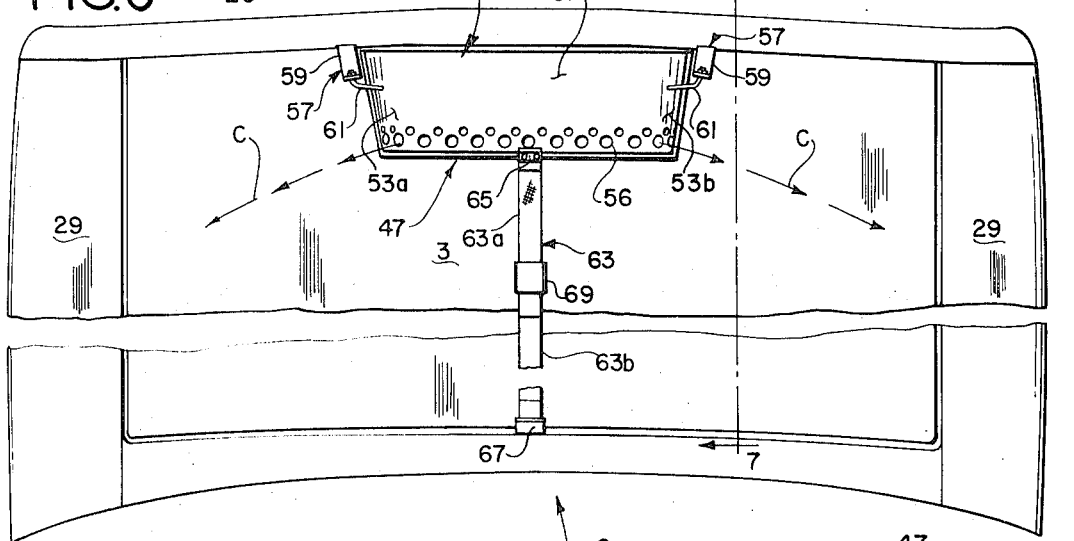
FIG. 6 is a plan view of the hood of an automobile including a modified deflector of the invention extending only partially across the width of the hood.
Figure 7:
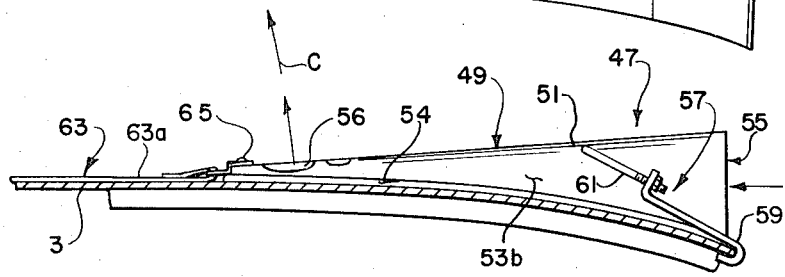
FIG. 7 is an enlarged section taken along line 7—7 of FIG. 6 showing the deflector releasably mounted on the hood.

A variation of deflector 1, indicated in its entirety at 47, is shown in FIGS. 6 and 7 secured to the forward portion of hood 3. Deflector 47 includes a channel-shaped member 49 having a top web portion 51 and left and right side flanges 53a and 53b, respectively, integrally formed from the top web and extending substantially longitudinally of the hood. Member 49 extends transversely of the hood and its length is substantially less than the width of the hood. This member is adapted to be mounted in inverted position on the hood to form in conjunction with the hood an air scoop having a low profile (as viewed from the side) with the web constituting the top wall of the scoop and with the hood constituting its bottom wall. The bottom of the side flanges and the rear edge of member 49 are contoured to the shape of the hood to seal thereagainst. Flexible, resilient seal material, as indicated at 54, is disposed between the bottom edges of side flanges 53a and 53b and the hood, and between the bottom edge of the rear margin of web 51 and the hood thus sealing the side and rear of the member to prevent the flow of air therefrom and to protect the hood from damage. The front edge of the web is spaced above the hood and it forms a forward facing inlet opening 55 into which air is rammed as the automobile is driven at highway speeds. A plurality of openings 56 is provided in the rear margin of web 51 and in the rear portions of side flanges 53a and 53b. These openings constitute outlets for the air rammed into the scoop. The height and cross-sectional area of the scoop decrease from front to rear, and the total cross-sectional area of outlets 56 is less than the cross-sectional area of inlet 55, whereby the pressure within the scoop increases from front to rear causing streams of air to be exhausted from the outlets at high speed. The air exhausted from the outlets intermediate side flanges 53a, 53b is directed generally vertically of the hood and the air exhausted from the outlets in the side flanges (these last-mentioned outlets constituting side outlets) is directed toward the sides of the hood in a generally vertical direction. The air streams overlap forming a continuous air curtain extending transversely of the hood from one side thereof to the other. Thus air-borne particles in the path of the automobile are effectively deflected by the air curtain in a generally vertical direction clear of windshield 7 over its entire width before the particles strike the windshield.

Preferably, deflector 47 is removably secured to hood 3 to permit installation and removal of the deflector without damage to the hood. The forward portions of side flanges 53a and 53b are each held against the hood by a hook assembly generally indicated at 57 including a hood 59 engageable with the forward edge of hood 3 and an adjustable rear member 61 secured to an adjacent side flange of the deflector. The rear portion of the deflector is held against the upper surface of the hood by an adjustable strap assembly generally indicated at 63. This strap assembly has a forward strap 63a secured to the center of the rear margin of web 51, as indicated at 65, and a rear strap 63b having a hook 67 at its rear end for being hooked over the rear edge of the hood. The front and rear straps are secured together by a buckle 69 enabling them to be tensioned to hold hook members 59 in engagement with the front edge of the hood and to hold the bottom edges of member 49 in engagement with hood 3 to close off the sides and rear of the member. The tensioning of the strap assembly is sufficient to hold the deflector against the hood as the automobile is driven at highway speeds.

It will be noted that the low profile of deflectors 1 and 47 does not substantially block the driver's view of the road, and that with the webs of such deflectors made of transparent synthetic resin material, the driver may view the road by looking through the web.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A deflector for deflecting air-borne particles such as insects, rain, roadspray and the like clear of the windshield of an automobile comprising a member of channel hape shape section having a web, side flanges, and means at one end thereof closing the channel, said member being adapted to be mounted in inverted position on the hood of an automobile with said flanges extending longitudinally of the hood and said closed end of said member at its rear to form in conjunction with the hood an air scoop, the other end of said member constituting its front end being spaced above the hood to form a forward facing inlet opening into which air is rammed as the automobile is driven at highway speeds, the cross-sectional area of said scoop decreasing from front to rear, the web of said member having a plurality of openings in one margin thereof extending transversely of the hood at the rear of said member, said openings constituting outlets for directing air rammed into the scoop in a generally vertical direction to thereby form an air curtain extending transversely of the hood for deflecting said air-borne particles clear of the windshield.

2. A deflector as set forth in claim 1 wherein said member extends transversely of the hood from one side thereof to the other and includes means for securing the member to the hood to the side edges thereof.

3. A deflector as set forth in claim 2 wherein said hood has a flange at each side edge thereof extending down from its upper surface, said side flanges of the member constituting said securing means, said side flanges each being adapted to be secured to a respective adjacent one of the hood flanges.

4. A deflector as set forth in claim 3 wherein each of said side flanges has an opening therein constituting a side outlet for the discharge of air sidewise from the deflector, said sidewise flow of air constituting a part of said air curtain for effectively preventing air-borne particles from striking the sides of the windshield.

5. A deflector as set forth in claim 3 further comprising means for supporting the front end of the member intermediate the side flanges thereof in spaced relation above the upper surface of the hood.

6. A deflector as set forth in claim 5 wherein said supporting means comprises a brace member extending between the web and the hood having a friction clip at the lower end of the brace member for engaging the forward edge of the hood thereby releasably securing the brace member to the hood without damage thereto.

7. A deflector as set forth in claim 3 further comprising an elongate member secured to the rear margin of said member for strengthening the latter, said elongate member having a generally vertical lower portion extending downwardly from the rear margin of said member toward said hood, and resilient material disposed between the hood and said lower portion, said lower portion and said resilient material constituting said means closing one end of the channel.

8. A deflector as set forth in claim 2 wherein said member is of a length substantially less than the width of the hood with air being directed from said outlets in a generally vertical direction and toward the sides of the hood for forming an air curtain extending substantially the width of the hood, whereby air-borne particles are effectively deflected clear of the windshield across its entire width.

9. A deflector as set forth in claim 8 wherein each of said side flanges has an opening therein constituting a side outlet for the discharge of air sidewise from the deflector, said sidewise flow of air constituting a part of said air curtain for preventing said air-borne particles from striking the sides of the windshield.

10. A deflector as set forth in claim 8 wherein said side flanges are integral with the web and have bottom edges contoured to the shape of the hood to seal thereagainst.

11. A deflector as set forth in claim 10 wherein said securing means releasably holds the bottom edges of said side flanges and the closed end of said member in engagement with the hood to prevent the flow of air therefrom, and comprises a pair of hooks, one at each side flange, engageable with the forward edge of the hood for holding the bottom edges of the side flanges thereagainst, and means carried by the rear margin of said member for holding its rear margin against the hood.

12. A deflector as set forth in claim 11 wherein said means holding the rear portion of the member against the hood comprises adjustable strap means having one end thereof secured to the rear margin of the member and having its other end secured to the rear edge of the hood, whereby tensioning of the strap holds the hook at the side flanges of the member against the forward edge of the hood and holds the bottom edges of said side flanges and the rear margin of the member down against the hood.

13. A deflector as set forth in claim 1 wherein said web is made of transparent synthetic resin material for providing the driver of the automobile with a clear view of the road.

* * * * *